US006987677B2

(12) United States Patent
Konno

(10) Patent No.: US 6,987,677 B2
(45) **Date of Patent: *Jan. 17, 2006**

(54) SWITCHING POWER SUPPLY APPARATUS

(75) Inventor: Akira Konno, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/096,173

(22) Filed: Mar. 31, 2005

(65) Prior Publication Data

US 2005/0169019 A1 Aug. 4, 2005

Related U.S. Application Data

(63) Continuation of application No. 10/415,384, filed on Aug. 28, 2003, now Pat. No. 6,912,141.

(30) Foreign Application Priority Data

Aug. 31, 2001 (JP) ........................... P2001-264469

(51) Int. Cl.
*H02M 3/335* (2006.01)

(52) U.S. Cl. .................. 363/49; 363/21.08; 363/21.16; 363/97

(58) Field of Classification Search ............. 363/21.08, 363/21.16, 49, 97
See application file for complete search history.

(56) References Cited

U.S. PATENT DOCUMENTS 5,661,642 A * 8/1997 Shimashita ............. 363/21.15

* cited by examiner

*Primary Examiner*—Gary L Laxton
(74) *Attorney, Agent, or Firm*—Sonnenschein, Nath & Rosenthal LLP

(57) ABSTRACT

A switching power supply apparatus (200) for controlling the operation of a switching FET (225) adapted for switching a rectified smoothed output of a primary side rectifying smoothing circuit (215) by a switching controlling circuit (230) having a hysteresis low-voltage mistaken operation prohibiting circuit. An output of a ternary winding (220C) of a converter transformer is rectified and smoothed by a rectifying smoothing circuit (238) to drive the switching controlling circuit (230). An output voltage of the ternary winding (220C), varied in dependence upon the load state on the secondary side of a converter transformer (220) is set so as to be lower than a low voltage protective voltage in case the voltage is lower than a design load and so as to be higher than the low voltage protective voltage in case the voltage is higher than the design load, in order to carry out an intermittent operation during standby time. Thus, the switching operation during standby time may be carried out intermittently to minimize the power consumption to realize the energy saving during standby time, simply by adjusting the values of respective key devices, without appreciably changing the pre-existing circuitry.

1 Claim, 4 Drawing Sheets

SWITCHING POWER SUPPLY APPARATUS

RELATED APPLICATION DATA

The present application is a continuation of U.S. application Ser. No. 10/415,384, filed Aug. 28, 2003, now U.S. Pat. No. 6,912,141, and claims priority to PCT/JP02/08264 filed Aug. 13, 2002.

BACKGROUND OF THE INVENTION

This invention relates to a switching power supply apparatus for controlling the switching operation of a switching element adapted for switching a rectified smoothed output of a primary side rectifying smoothing circuit by a switching controlling circuit having a hysteresis low-voltage mistaken operation preventative circuit.

BACKGROUND ART

Up to now, a switching power supply apparatus for switching a DC current, obtained on rectifying and smoothing the commercial AC current, at a high frequency on the order of, for example, 100 kHz, and for transforming the resulting current to a desired voltage by a transformer to a high efficiency, has been in use.

As an output voltage controlling system in the above-described switching power supply apparatus, a pule width modulation (PWM) controlling system for controlling the duty ratio of the switching pulses responsive to changes in the output voltage, and a frequency (e.g., resonation) controlling system or a phase controlling system for controlling the frequency or the phase of switching pulses, have so far been used.

FIG. 1 shows an illustrative circuit structure of a conventional switching power supply apparatus employing a PWM controlling system.

This switching power supply apparatus 100 includes a primary rectifying smoothing circuit 115 for rectifying and smoothing the AC input supplied from a commercial power supply AC through an AC filter 110. To this primary rectifying smoothing circuit 115, there are connected the drain of a switching FET 125 through a primary winding 120A of a converter transformer 120 and a power supply terminal 130A of a switching controlling circuit 130 through a startup circuit 140. The switching controlling circuit 130 controls the switching operation of the switching FET 125 by PWM control. The power supply terminal 130A is grounded through a capacitor 135.

In order to prevent malfunctions of the switching controlling circuit 130 at the time of lowering of the power supply voltage, the switching controlling circuit 130 has enclosed therein a hysteresis low voltage malfunction prohibiting circuit. When the power supply voltage Vcc, applied to the power supply terminal 130A, is increased from 0V, the prohibiting circuit starts its operation at Vcc=16.5V and, when the power supply voltage is lowered, the prohibiting circuit interrupts an output at Vcc= 9.0V.

A secondary rectifying smoothing circuit 150 is connected to a secondary winding 120B of the converter transformer 120, such that a converter output obtained in the secondary winding 120B of the converter transformer 120 is rectified and smoothed by the secondary rectifying smoothing circuit 150 so as to be output via an output filter 155. An output detection circuit 170 is connected to this secondary rectifying smoothing circuit 150 through a resistance dividing circuit 160 for detecting the output voltage and a resistor 165 for detecting the output current. A detection output by this output detection circuit 170 is fed back via a photocoupler 180 to the switching controlling circuit 130. The output detection circuit 170 and the photocoupler 180 are actuated by a rectified smoothed output of a rectifying smoothing circuit 190, connected to a secondary winding 120B of the converter transformer 120, as a driving source.

The switching controlling circuit 130 is started by the startup current supplied on startup from the primary rectifying smoothing circuit 115, through a startup circuit 140, to commence the supply of switching pulses to the switching FET 125. After startup, the switching controlling circuit 130 is actuated with the rectified smoothed output by a rectifying smoothing circuit 138, connected to a ternary winding 120C of the converter transformer 120, as a driving power supply. That is, the switching controlling circuit PWM-controls the switching operation of the switching FET 125 to stabilize the converter output, by the duty cycle of the switching pulse being changed responsive to the detection output by the output detection circuit 170 fed back by the photocoupler 180.

If, in the conventional switching power supply apparatus 100, the power of the output detection circuit 170 is taken from an output line in the usual constant current taking operation (constant current charging operation) for a battery, the range of voltage variations is of an extremely wide width, such that a separate power supply is needed which is capable of supplying a constant stable voltage in order to assure stabilized control. To this end, the range of voltage variations is diminished to as small a value as possible by providing a series regulator, using a different winding of the same transformer with loose coupling for use as a power supply relatively insusceptible to load variations, or by using a separate rectifying smoothing circuit for the same winding, in order to provide for stabilized control.

In a power source supply system, in which the power for the output detection circuit 170 is supplied by separate rectification from the same winding of the same transformer, in order to control the output of the low power switching power supply performing the intermittent operation during standby to a constant voltage and a constant current, the power required for control during the switching stop time for the intermittent operation is supplied by the smoothing capacitance of a rectifying smoothing circuit 190. This increases the capacity of a smoothing capacitor 191 of the rectifying smoothing circuit 190. Moreover, there is raised a problem of the effect of chronological changes in capacitance because a large capacitance is required and hence an electrolytic capacitor of good volume capacitance ratio is used.

On the other hand, in a conventional standby power saving type switching power supply apparatus, an intermittent operation is carried out by detecting the oncoming no-load or light-load conditions to stop the switching operation to save the power.

For detecting the load, it is known to insert a resistor in series with a load to detect the voltage drop occurring across both ends. If the minute current for the light-load state (of the order of 10 mA) is to be detected accurately by this method, the detection resistance must be set to tens to hundreds of ohms. In the case of a heavy load, the voltage drop or heat evolution at the detection resistor poses a problem. Heretofore, these problems are tackled by a method of shorting the detection resistor with a semiconductor device. However, the circuitry becomes complicated to raise the cost.

If the state of the load is detected and found to be a normal load, the LED of the photocoupler for verifying the load state is turned on and the resulting signal is transmitted to a primary side control circuit. If the state of the load is found to be no load or light load state, the LED of the photocoupler is turned off to stop the switching. In order to perform this control, it is necessary to effect the transmission using a photocoupler for verifying the load state distinct from the feedback photocoupler for controlling the constant voltage, thus requiring a redundant circuit.

In startup, the photocoupler for verifying the load state experiences an output devoid state and hence the driving voltage is in shortage because certain time is needed until the secondary side output voltage is increased to a setting value. As this state tends to be judged to be the no-load or light-load state, the circuitry for avoiding the mistaken judgment must needs be added.

Moreover, the photocoupler is on at all times during the normal operation, thus consuming redundant power, with the result that power saving during the operation is not achieved.

SUMMARY OF THE INVENTION

It is therefore an object of the present invention to provide a switching power supply apparatus in which the standby time switching operation is performed intermittently, by simply adjusting the values of respective key devices, without appreciably changing the pre-existing circuit, to minimize the power consumption to achieve energy saving during the standby time, as well as to enable ordinary operations, such as constant voltage constant current operations or various protective functional operations, without being affected by the circuitry designed to perform the intermittent operations.

The present invention provides a switching power supply apparatus wherein a startup current from a primary side startup circuit is supplied to a switching controlling circuit having a hysteresis low-voltage mistaken operation prohibiting circuit to start up the switching controlling circuit by the energy accumulated in a capacitor for a voltage range from a low voltage protective voltage of the low-voltage mistaken operation prohibiting circuit to a release voltage, a switching operation of a switching element switching a rectified smoothed output of a primary side rectifying smoothing circuit, supplied to a primary side of a converter transformer, is controlled by the switching controlling circuit, an output of a ternary winding of the converter transformer is rectified and smoothed after startup, by a rectifying smoothing circuit to produce a rectified smoothed output which drives the switching controlling circuit, a converter output, obtained in a secondary winding of the converter transformer, is rectified and smoothed by a secondary side rectifying smoothing circuit, so as to be output, an error signal is fed back from a secondary side output detection circuit through a photocoupler to the switching controlling circuit to control the switching operation of the switching element by the switching controlling circuit, and wherein an output voltage in the ternary winding, changing depending on the load state in a secondary side of the converter transformer, is set so as to be lower than the low voltage protective voltage for the current less than a setting load current and so as to be higher than the low voltage protective voltage for the current not less than the setting load current, whereby an intermittent operation is performed during standby time.

DETAILED DESCRIPTION OF THE PRESENTLY PREFERRED EMBODIMENTS

Figure 1:
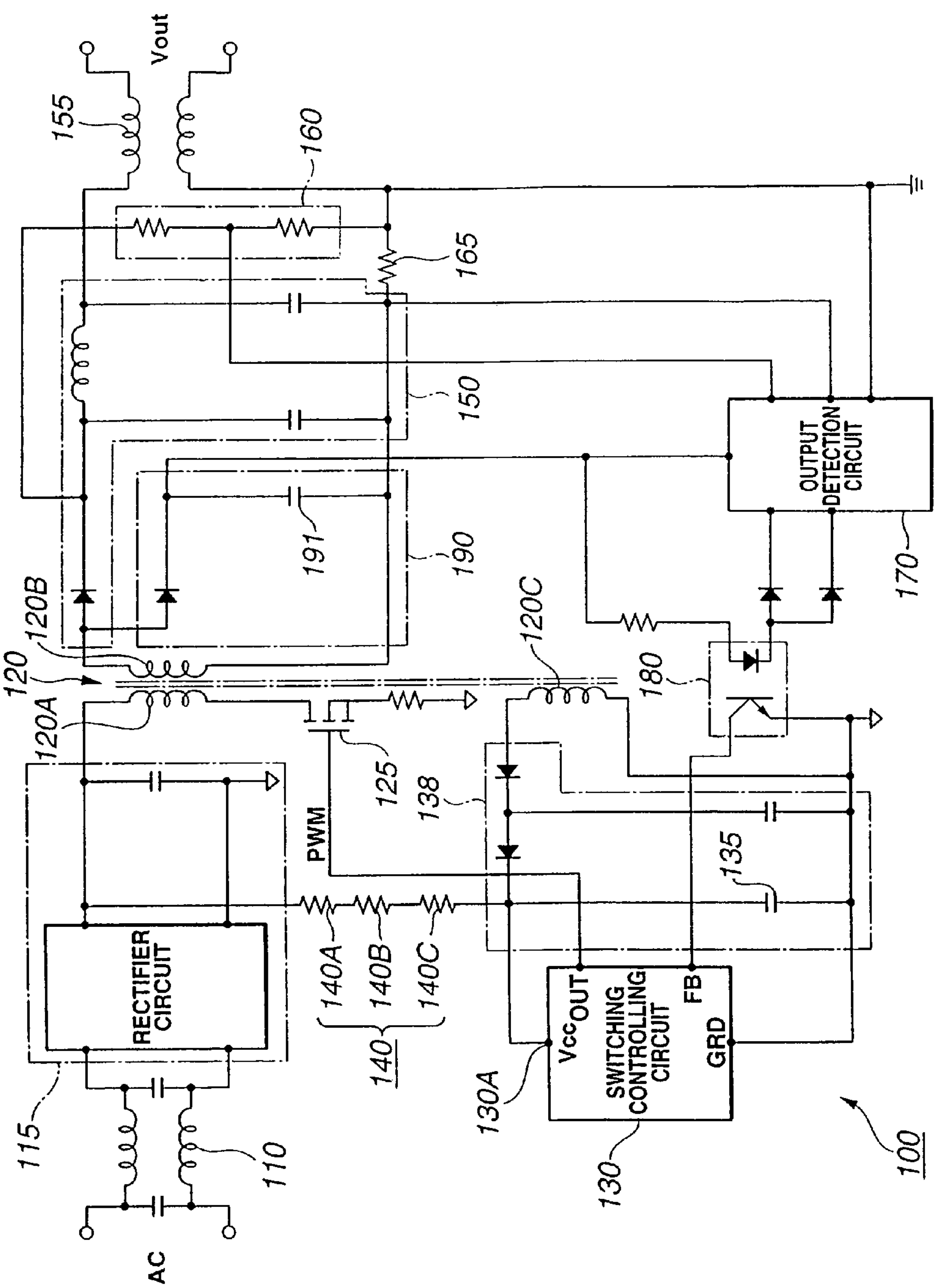
FIG. 1 is a block diagram showing the structure of a conventional switching power supply apparatus.

Referring to the drawings, a present embodiment of the present invention is explained in detail.

Figure 2:
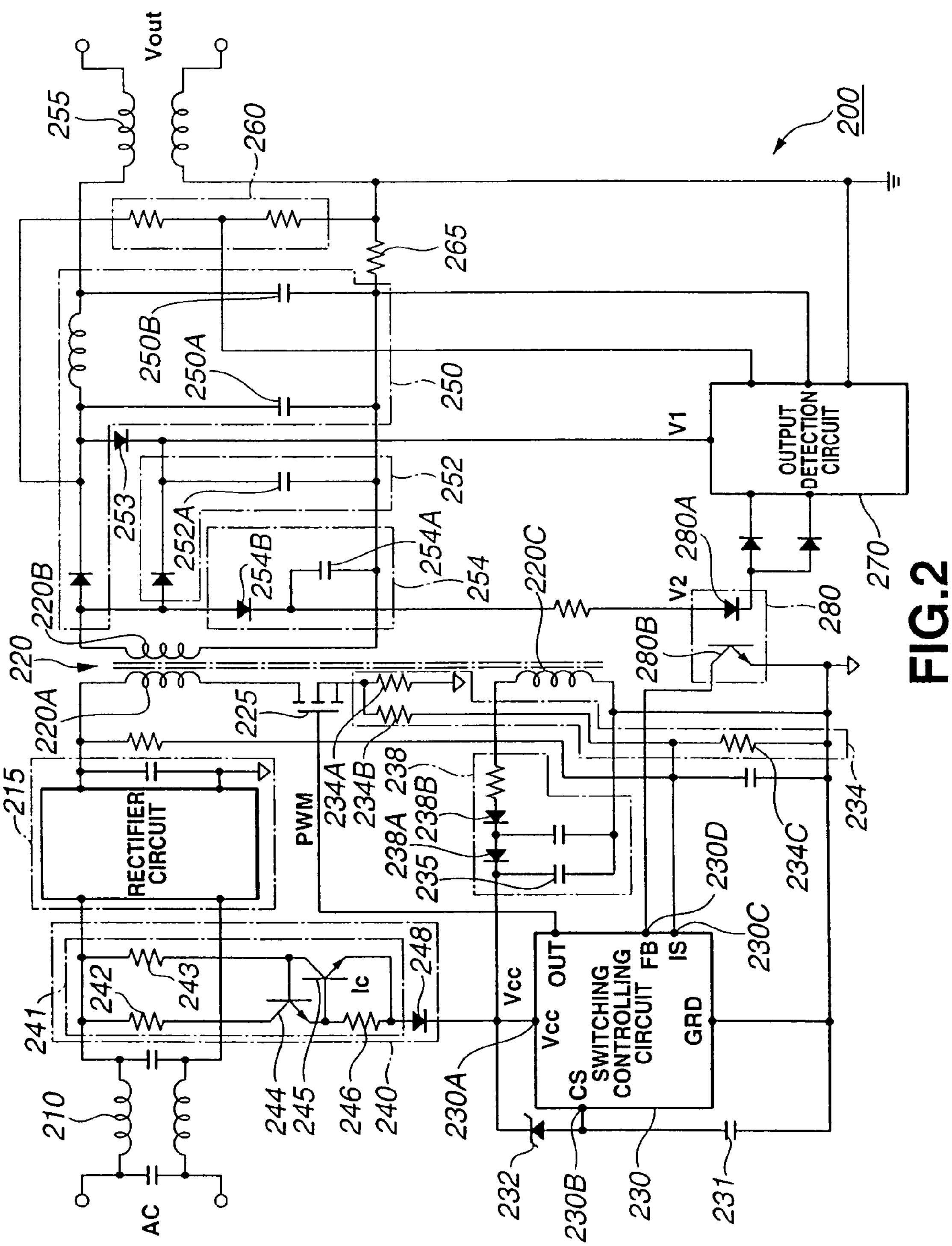
FIG. 2 is a block diagram showing the structure of a switching power supply apparatus according to the present invention.

The present invention is applied to a switching power supply apparatus 200 having a structure shown for example in FIG. 2.

This switching power supply apparatus 200 includes a primary side rectifying smoothing circuit 215, for rectifying and smoothing the AC input supplied from the commercial power supply AC through an AC filter 210. To this primary side rectifying smoothing circuit 215 is connected the drain of a switching FET 225 through a primary winding 220A of a converter transformer 220.

There is also connected a switching controlling circuit 230 for PWM controlling the switching operation of the switching FET 225. The junction point of the AC filter 210 and the primary side rectifying smoothing circuit 215 is connected through a startup circuit 240 to a power supply terminal 230A of the switching controlling circuit 230.

The power supply terminal 230A of the switching controlling circuit 230 is supplied with a rectified smoothed output by a rectifying smoothing output 238, connected to a ternary winding 220C of the converter transformer 220, as a driving power. The power supply terminal 230A is grounded via a capacitor 235.

In order to prevent mistaken operations in case the power supply voltage is lowered, the switching controlling circuit 230 has enclosed therein a hysteresis low voltage mistaken operation prohibiting circuit, such that, when the power supply voltage Vcc, applied to the power source terminal 230A, is increased from 0V, the operation is initiated at Vcc=16.5V, with the control output being interrupted at Vcc= 9.0V when the power supply voltage is lowered.

On the other hand, the switching controlling circuit 230 has a soft start function, specifically, a CS terminal 230B for soft start control is grounded via a capacitor 231 affording a time constant for soft start, while being connected to the power supply terminal 230A through a Zener diode 232 adapted for detecting the power supply terminal 230A.

The switching controlling circuit 230 has an over-current limiting function, and includes an IS terminal 230C for over-current detection, which is connected through a resistor for correcting the input voltage to a junction between the primary side rectifying smoothing circuit 215 and the primary winding 220A of the converter transformer 220 and which is also connected to a constant power protection circuit 234, made up by three resistors 234A, 234B and 234C, connected to the source of the switching FET 225.

The startup circuit 240 includes a constant current circuit 241, connected to a junction between the AC filter 210 and the primary side rectifying smoothing circuit 215, and which is connected through a reverse current inhibiting diode 248 to a power supply terminal 230A of the switching controlling circuit 230.

The constant current circuit 241 includes first and second NPN transistors 244, 245, having collectors connected via resistors 242, 243 to a junction between the AC filter 210 and the primary side rectifying smoothing circuit 215. The base of the first NPN transistor 244 is connected to the collector of the second NPN transistor 245. The junction between the emitter of the first NPN transistor 244 and the base of the second NPN transistor 245 is connected via a current detection resistor 246 to the emitter of the second NPN transistor 245, while being connected to the cathode of the reverse current inhibiting diode 248.

In the constant current circuit 241, the voltage across both ends of the current detection resistor 246 is detected by the second NPN transistor 245 to control the current flowing from the resistor 243 to the base of the first NPN transistor 244 to cause the constant current Ic to flow through the current detection resistor 246.

To a secondary winding 220B of the converter transformer 220, there are connected a rectifying smoothing circuit 252 for supplying the driving power to a secondary rectifying smoothing circuit 250 and an output detection circuit 270 and a rectifying smoothing circuit 254 for supplying the driving power to the photocoupler 280. An output end of the secondary rectifying smoothing circuit 250 is connected to an output end of the rectifying smoothing circuit 252 through a diode 253.

A converter output, obtained in a secondary winding 220B of the converter transformer 220, is rectified and smoothed by the secondary side rectifying smoothing circuit 250 and output via output filter 255. To the secondary rectifying smoothing circuit 250 is connected the output detection circuit 270 via a resistance dividing circuit 260 for detecting the output voltage and a resistor 265 for detecting the output current, with the detected output by this output detection circuit 270 being fed back to the switching controlling circuit 230 via photocoupler 280.

In the above-described switching power supply apparatus 200, the switching controlling circuit 230 is started by being fed in startup via startup circuit 240 to begin to supply the switching pulses to the switching FET 225. After startup, the switching controlling circuit 230 is driven with the rectified smoothed output by the rectifying smoothing circuit 238 connected to the ternary winding 220C of the converter transformer 220 as the driving power. The detection output by the output detection circuit 270 is fed back via photocoupler 280 to PWM-control the switching operation of the switching FET 225 to provide for a stabilized converter output.

In startup, the switching power supply apparatus 200 operates as follows:

When the AC input is supplied from the commercial power supply, the constant current (Ic=0.1 mA) is caused to flow through the resistor 242 of the startup circuit 240, first NPN transistor 244, current detection resistor 246 and the reverse current inhibiting diode 248 to the capacitor 235 to start the charging.

The voltage Vcc, applied to the power supply terminal 230A of the switching controlling circuit 230, is increased gradually as the charging of the capacitor 235 proceeds. When the minimum startup voltage of the low voltage mistaken operation prohibiting circuit (16.5V) is exceeded, the switching controlling circuit 230 commences its operation to output the switching pulses to the switching FET 225.

The current consumption of the switching controlling circuit 230 is increased at this time, with the voltage across the terminals of the capacitor 235 being lowered. By the operation of the low voltage mistaken operation prohibiting circuit with hysteresis, the switching operation is continued by the energy stored in the capacitor 235 up to the minimum operating voltage (V1=9V).

By the current switched in the interim, the high frequency current is caused to flow via converter transformer 220 through the secondary and ternary windings 220B, 220C. This high frequency current is rectified by the secondary rectifying smoothing circuit 250 and output via output filter 255 from the output terminal as a converter output.

This voltage is also compared to a reference voltage via resistance dividing circuit 260 by the output detection circuit 270. If the output voltage is high or low, a light-emitting diode 280A of the photocoupler 280 is turned on or off, respectively, to transmit the signal to the primary side switching controlling circuit 230 to vary the duty of the switching pulse supplied to the gate of the switching FET 225 to control the output voltage Vout to a preset voltage.

On the other hand, the output of the ternary winding 220C is rectified and smoothed on the primary side by the rectifying smoothing circuit 238 and charged to the capacitor 235 so as to be supplied as the driving power supply for the switching controlling circuit 230. Since the voltage Vcc (12V under the normal operating state) is higher than the voltage from the startup circuit 240 (11V on stabilized startup), the power supply from the startup circuit 240, connected via the reverse current inhibiting diode 248, is halted.

With the secondary winding 220B and the ternary winding 220C of the converter transformer 220 wound in the opposite direction to that of the primary winding 220A, the switching power supply apparatus 200 is a switching power supply of the on/off (flyback) switching system. If the load of the controlled secondary winding 220B is heavy, the output characteristics of the non-controlled ternary winding 220C become correspondingly higher, termed below the characteristics of cross-regulation, while being independent from the input voltage applied to the primary winding 220A and being constant for the constant load of the secondary winding 220B.

During the normal operation, the switching power supply apparatus 200 operates as follows:

In the present switching power supply apparatus 200, an error signal, obtained on comparing the output voltage to the reference voltage by the secondary side output detection circuit 270 after startup, is fed back through the photocoupler 280 to an FB terminal 230D for feedback input of the primary side switching controlling circuit 230 to commence the switching control of the switching FET 225 by the switching controlling circuit 230. The power supply terminal 230A of the switching controlling circuit 230 is supplied with a driving power from the rectifying smoothing circuit 238 connected to the ternary winding 220C of the converter transformer 220. The switching controlling circuit 230 performs PWM control of the switching operation of the switching FET 225 so that the output voltage Vout will be constant against non-load operations or changes in the input voltage. When more than a design quantity of the load current is taken from the output, the voltage across both ends of the current detection resistor 265 is higher than the design reference value and is detected by the output detection circuit 270 adapted for comparing the voltage across both ends of the current detection resistor 265 to the reference voltage. The switching controlling circuit 230 is responsive to a detection output by the secondary side output detection circuit 270 to lower the output voltage Vout to execute PWM control of the switching operation of the switching FET 225.

Although the output voltage Vout is lowered at this time, the power supply voltage of the output detection circuit 270, supplied from the rectifying smoothing circuit 252 distinct from the secondary rectifying smoothing circuit 250, is not lowered as compared to the output voltage Vout, thus enabling stabilized control. On the other hand, the output voltage of the rectifying smoothing circuit 238, connected to the ternary winding 220C of the converter transformer 220, is higher than the minimum operating voltage of the low-voltage mistaken operation prohibiting circuit (V1=9V), such that the switching controlling circuit 230 is able to continue the stabilized operation with the output voltage of the rectifying smoothing circuit 238 as the driving power supply.

Figure 3:
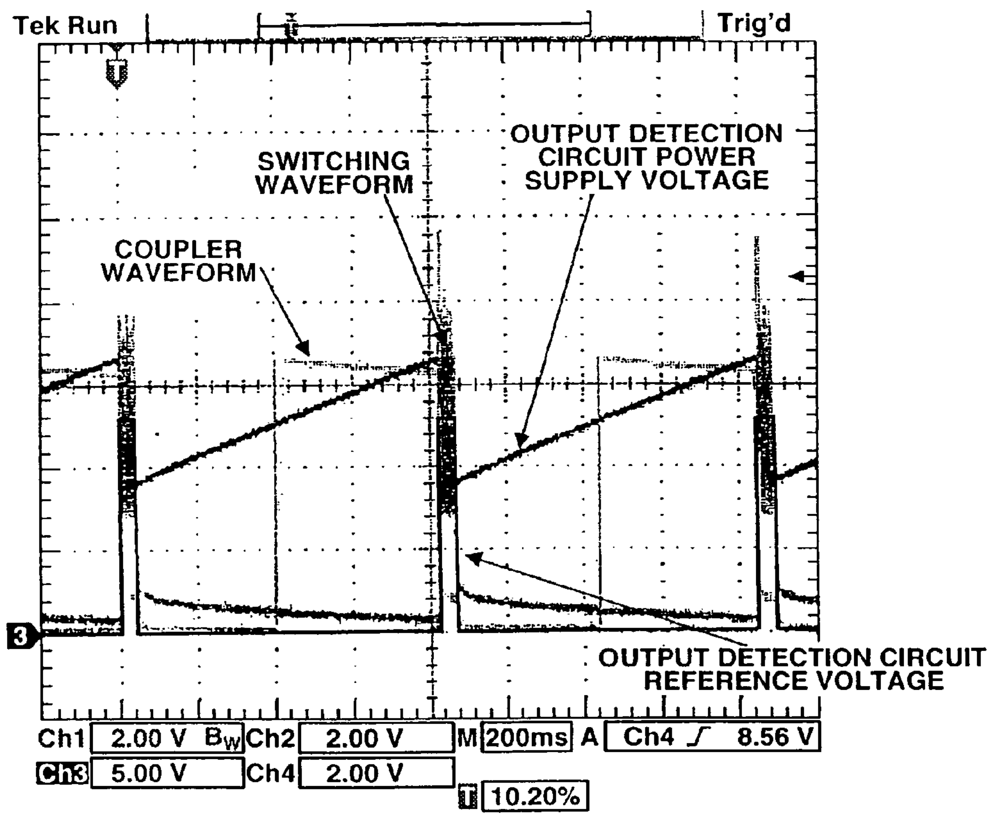
FIG. 3 is a waveform diagram showing the waveform of the intermittent operation of the switching power supply apparatus according to the present invention.

In a no-load condition, the switching power supply apparatus 200 also operates as follows:

In the present switching power supply apparatus 200, an error signal, obtained on comparing the output voltage to the reference voltage by the secondary side output detection circuit 270 after startup is fed back through the photocoupler 280 to an FB terminal 230D for feedback input of the primary side switching controlling circuit 230 to commence the switching control of the switching FET 225 by the switching controlling circuit 230. Due to lag in the transient response or to there being no load, the output voltage Vout, generated in the secondary side, is higher than the reference voltage used for comparison in the output detection circuit 270. The result is that the output to the light emitting diode 280A of the photocoupler 280 is turned on to actuate the switching controlling circuit 230 to halt the switching operation of the switching FET 225. Although an output voltage is generated in the interim across the ternary winding 220C, such voltage is lower than the low voltage protective voltage, because of the light output load, this output voltage being insufficient to raise the power supply voltage Vcc of the switching controlling circuit 230. The power supply voltage Vcc of the switching controlling circuit 230 is lowered to a level of the minimum operating voltage of the low-voltage mistaken operation prohibiting circuit (V1=9V). When the power supply voltage Vcc is lowered to 9V, the switching controlling circuit 230 halts its operation to enter into a standby state. In the standby state, the current consumption of the switching controlling circuit 230 is decreased (6 $\mu$A) to increase the power supply voltage Vcc of the switching controlling circuit 230 through the startup circuit 240. When the power supply voltage Vcc exceeds the minimum startup voltage (16.5 V) of the low-voltage mistaken operation prohibiting circuit, the primary side switching controlling circuit 230 wakes up immediately to cause a PWM switching operation of the switching FET 225. This switching power supply apparatus 200 reiterates the aforementioned intermittent operating states, as shown in FIG. 3, to suppress the power consumption under a no-load condition.

Figure 4:
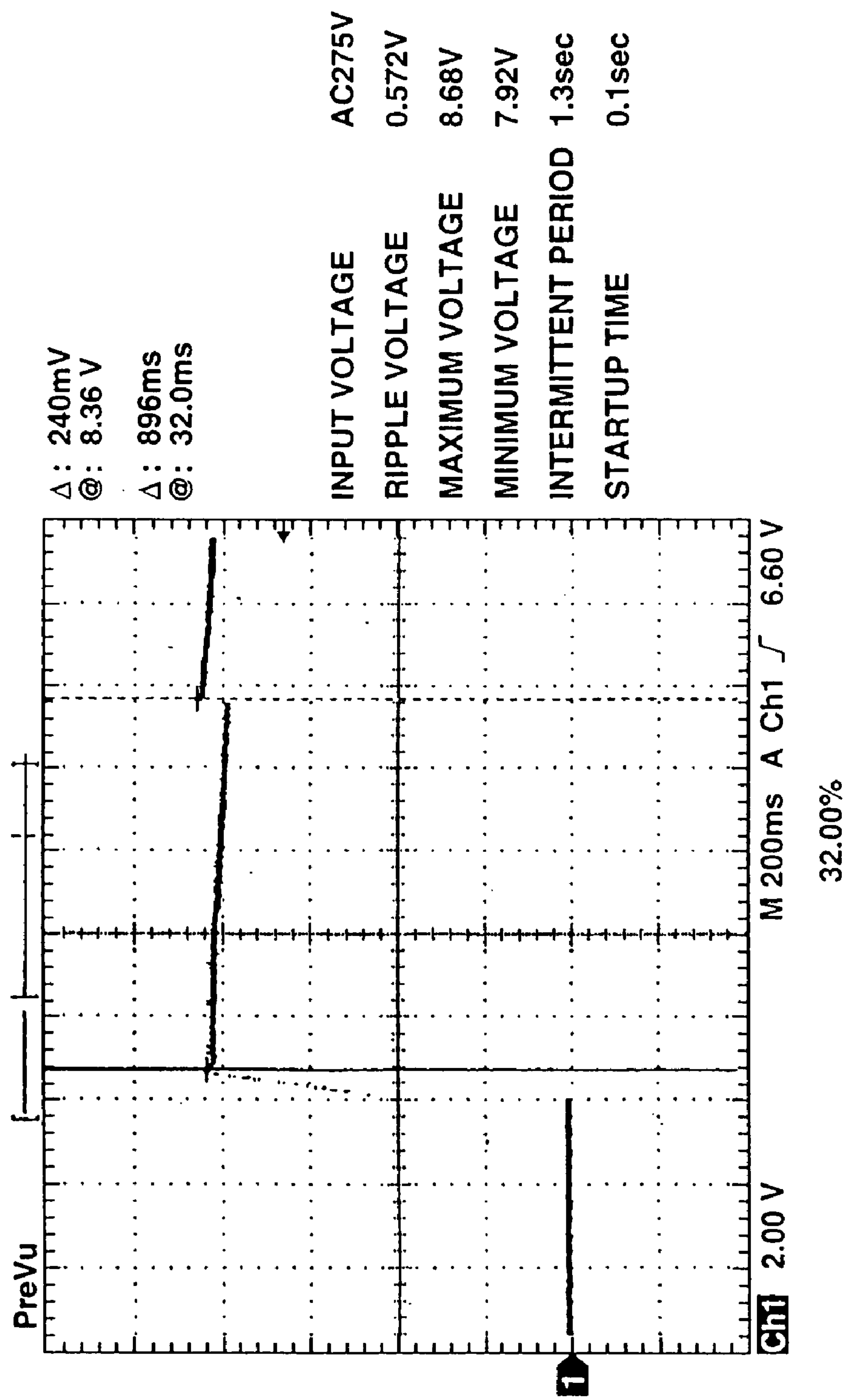
FIG. 4 is a waveform diagram showing the secondary side output waveform during the intermittent operation of the switching power supply apparatus according to the present invention.

It is noted that the low-voltage mistaken operation prohibiting circuit, with the operating voltage of 16.5V, enclosed within the switching controlling circuit 230, has hysteresis characteristics, such that it takes some time until the operation commencing voltage is reached. The secondary side output detection circuit 270 is continuing its operation in the interim by the energy stored in the capacitor 252A of the rectifying smoothing circuit 252. When the voltage is gradually lowered until the potential difference between it and the output exceeds the forward voltage Vf of the diode 253 exceeds the forward voltage Vf of the diode 253, the diode 253 is turned on so that the output detection circuit 270 continues to be supplied with the energy stored in the capacitors 250A and 250B of the secondary rectifying smoothing circuit 250. The rectified smoothed output by the secondary rectifying smoothing circuit 250, that is the secondary output voltage Vout, is also lowered in the interim, such that the voltage supplied from the rectifying smoothing circuit 254 to the light emitting diode 280A of the photocoupler 280 becomes equal to or lower than a limit value (5 V), as shown in FIG. 4. This decreases the current flowing through the light emitting diode 280A so that a photo transistor 280B of the photocoupler 280 is in the high impedance state. The period of the intermittent operation can be controlled from the secondary side by suitably selecting the capacitances of the capacitors 250A, 250B, 252A and 254A or by interconnecting plural diodes 254B of the rectifying smoothing circuit 254 in series, for thereby adjusting the forward voltage value.

It should be noted that transistor switches or semiconductor switches may be used in place of the diode 253 supplying the power from the secondary rectifying smoothing circuit 250 to the output detection circuit 270 in the course of the standby intermittent operations.

Meanwhile, under the light load condition, this switching power supply apparatus 200 executes the following intermittent operations:

That is, in this switching power supply apparatus 200, an error signal obtained on comparing the output voltage to the reference voltage by the secondary side output detection circuit 270 after startup is fed back to an FB terminal 230D for feedback input of the primary side switching controlling circuit 230 through the photocoupler 280 to commence the PWM control of the switching operations of the switching FET 225 by the switching controlling circuit 230 to stabilize the output voltage Vout generated in the secondary side. If the load is light, the voltage of the driving supply power supplied to the primary side switching controlling circuit 230 from the ternary winding 220C of the converter transformer 220 through the rectifying smoothing circuit 238, is decreased under the effect of the cross-regulation.

Thus, in the present switching power supply apparatus 200, the output voltage of the ternary winding 220C of the converter transformer 220 is adjusted as follows:

The output voltage of the ternary winding 220C of the converter transformer 220 is set, depending on the number of windings and the degree of linkage thereof and on the resistance value of the resistor 236, to a voltage not larger than the minimum operating voltage (V1=9V) of the low-voltage mistaken operation prohibiting circuit of the switching controlling circuit 230. This voltage not larger than the minimum operating voltage is 10.1V taking into account the forward voltage Vf of the diodes 235A and 235B of the rectifying smoothing circuit 238. In the case of the load current not less than the normal load current, such as approximately 10 mA, the output voltage of the ternary winding 220C is set to not less than a voltage for which the low-voltage mistaken operation prohibiting circuit is not in operation (10.2 V).

By setting the output voltage of the ternary winding 220C of the converter transformer 220, as described above, the supply of the current consumed in the switching controlling circuit 230 falls into shortage, with the power supply voltage Vcc of the switching controlling circuit 230 being progressively lowered to the minimum operating voltage for which the low-voltage mistaken operation prohibiting circuit (V1= 9V) is in operation. When the power supply voltage Vcc is lowered to 9V, the switching controlling circuit 230 halts its operation to enter into a standby state. In the standby state, the current consumption of the switching controlling circuit 230 is decreased (6 $\mu$A) to increase the power supply voltage Vcc of the switching controlling circuit 230 through the startup circuit 240. When the power supply voltage Vcc exceeds the minimum startup voltage (16.5 V) of the low-voltage mistaken operation prohibiting circuit, the primary side switching controlling circuit 230 wakes up immediately to cause a PWM switching operation of the switching FET 225. This switching controlling circuit 230 reiterates the aforementioned intermittent operating states to suppress the power consumption under a light load condition.

If once the primary side switching FET 225 commences the switching operation, the primary side switching FET 225 continues its switching operation until the secondary side output detection circuit 270 detects that the secondary side output voltage Vout is increased to a value not less than a prescribed value and the resulting detection output is fed back as a switching halting signal via photocoupler 280 to the FB terminal 230D for feedback input of the primary side switching controlling circuit 230 through the photocoupler 280.

As the aforementioned switching halting signal is fed back to the FB terminal 230D for feedback input of the primary side switching controlling circuit 230, the switching operation of the switching FET 225 is halted, such that the voltage V1 supplied from the capacitor 252A of the secondary side rectifying smoothing circuit 252 to the output detection circuit 270 or the voltage V2 supplied from the capacitor 254A of the rectifying smoothing circuit 254 to the light emitting diode 280A of the photocoupler 280 is decreased progressively. When the voltage V2 supplied to the light emitting diode 280A falls to an operating limit value (5V) or lower, the current flowing through the light emitting diode 280A is decreased, with the photo transistor 280B of the photocoupler 280 being in a high-impedance state, thus in a state ready for a switching operation of the primary intermittent period. This establishes the uncontrolled state similar to that at the startup time point, such that, during the switching operation of the next primary intermittent period, the switching controlling circuit 230 commences the switching operation of the switching FET 225 by the PWM signal of the maximum width as determined by the upper limit of the soft stall. When the switching FET 225 commences the switching operation, the charging current flows through diode 254B to a capacitor 254A of the secondary side rectifying smoothing circuit 254. The voltage V2 supplied from the rectifying smoothing circuit 254 to the light emitting diode 280A of the photocoupler 280 is raised to a value not lower than the operating limit value (5V) of the light emitting diode 280A to establish the operating state of the photocoupler 280. Thus, an error signal obtained on comparing the output voltage to the reference voltage by the secondary side output detection circuit 270 is fed back to an FB terminal 230D for feedback input of the primary side switching controlling circuit 230 through the photocoupler 280 to commence the PWM control of the switching operations of the switching FET 225 by the switching controlling circuit 230.

It is noted that the capacitance of the capacitor 254A of the rectifying smoothing circuit 254 is set so that the time until the voltage V2 supplied from the secondary side rectifying smoothing circuit 254 to the light emitting diode 280A of the photocoupler 280 is lowered to a value not larger than the operating limit value (5V) of the light emitting diode 280A will be shorter than the primary intennittent period.

In general, the power consumption of the light-emitting diode is larger than that of the output detection circuit 270, in particular the IC prepared by CMOS, such that, by separating the rectifying smoothing circuit 254 for supplying the driving power to the light emitting diode 280A of the photocoupler 280 from the rectifying smoothing circuit 252 for supplying the driving power to the output detection circuit 270 and by decreasing the capacitance of the capacitor 254A of the rectifying smoothing circuit 254, it is similarly possible to decrease the supplied voltage more promptly as compared to the controlling system before the secondary output voltage Vout is excessively lowered, and to shorten the intermittent period to reduce the output ripple by using a high impedance photocoupler 280.

Moreover, this switching power supply apparatus 200 transfers from the intermittent operation in the non-load or light-load state to the normal operation.

That is, in transferring from the intermittent operation under the non-load or light-load state to the normal operation, the load current taken out from the secondary winding 220B of the converter transformer 220 is increased when the intermittent switch is on. The on-time of the light emitting diode 280A of the photocoupler 280 by the increasing output voltage becomes shorter, with the light emitting diode 280A being off in short time. The output voltage of the ternary winding 220C of the converter transformer 220 is also increased with the increasing load current, with the power supply voltage Vcc of the primary side switching controlling circuit 230 not being lowered to the minimum operating voltage (V1=9V) of the low-voltage mistaken operation prohibiting circuit, whereby the switching controlling circuit 230 outputs switching pulses to perform PWM control of the switching operation of the switching FET 225 to provide for the normal continuous operation of the constant voltage output.

The switching power supply apparatus 200 transfers from the normal operation to the intermittent operation as follows:

That is, in transferring from the normal operation to the intermittent operation under non-load or light-load, the output voltage of the ternary winding 220C of the converter transformer 220 is decreased with the decreasing load. When the power supply voltage Vcc of the primary side switching controlling circuit 230 is lowered to the minimum operating voltage of the low-voltage mistaken operation prohibiting circuit (V1=9V), the switching controlling circuit 230 halts its operation to enter into a standby state. In the standby state, the current consumption of the switching controlling circuit 230 is decreased (6 $\mu$A), with the constant current being caused to flow from the startup circuit 240 through the reverse current prohibiting diode 248 to the capacitor 235, by way of charging, to increase the power supply voltage Vcc of the switching controlling circuit 230. When the power supply voltage Vcc exceeds the minimum startup voltage (16.5 V) of the low-voltage mistaken operation prohibiting circuit, the primary side switching controlling circuit 230 wakes up immediately to cause a PWM switching operation of the switching FET 225. This switching controlling circuit 230 reiterates the aforementioned intermittent operating states to suppress the power consumption under a light load condition.

Although the present invention is applied to a switching power supply apparatus, employing the PWM controlling system, the present invention may be applied to a switching power supply apparatus employing a frequency controlling system.

Thus, according to the present invention, the switching operation during standby may be carried out intermittently, by simply adjusting the value of the respective key devices, without appreciably changing the circuit now in use, such as to achieve energy saving during standby, as well as to perform usual operations, such as constant voltage, constant current and various protective functional operations, without affecting the circuitry designed to execute the intermittent operations.

Moreover, the driving power during the normal operations of the primary side switching controlling circuit is supplied from the ternary winding, with the voltage being proportionate to the secondary side output current, by the cross-regulation effect, so that, by setting the sleep state or the wake-up state by exploiting the low-voltage mistaken operation prohibiting circuit of the primary side switching controlling circuit, the intermittent operating state can readily be achieved under the cross-regulation effect.

The intermittent period can be controlled by setting the capacitance, bresistance and the number of turns of the windings, thus providing a simplified circuit.

The intermittent period can be adjusted readily in stability.

Moreover, the output ripple voltage adjustment by the intermittent operation can be adjusted extremely readily.

What is claimed is:

1. A power-supply switching method comprising:

producing a driving output from a rectifying smoothing circuit for driving a switching control circuit having an input voltage and hysteresis low-voltage mistaken operation circuit;

accumulating in a capacitor energy corresponding to a range of voltage of said hysteresis low-voltage mistaken operation circuit from a protective voltage to a release voltage;

supplying a startup current from a primary side startup circuit to said switching control circuit, wherein said hysteresis low-voltage mistaken operation circuit prohibits said primary side startup circuit from starting up said switching control circuit based on energy accumulated in said capacitor;

producing a primary rectified output from a primary side rectifying circuit;

producing a secondary rectified output from a secondary side rectifying circuit;

receiving said primary rectified output by a primary winding of a converter transformer;

producing a tertiary output from a tertiary winding of said converter transformer, which is wound in a direction opposite to that of the primary winding;

switching said primary rectified output; and providing an error feed back signal by an output detection circuit to said switching control circuit via a photocoupler to control the switching element by said switching control circuit;

wherein after said primary side startup circuit supplies said startup current to said switching control circuit, a tertiary output of said tertiary winding is rectified and smoothed by said rectifying smoothing circuit to produce said driving output;

wherein said tertiary output is lower than said protective voltage when a current supplied to a secondary winding of said converter transformer, which is wound in a direction opposite to that of the primary winding, is less than a predetermined setting load current, and said tertiary output is higher than said protective voltage when a current into said secondary winding is greater than said predetermined setting load current; and wherein the switching control circuit enters into a standby state when said input voltage is less than or equal to said release voltage.

* * * * *